Dec. 17, 1929.　　　　R. E. ANDREW　　　　1,739,815
SAFETY DEVICE FOR SUBMARINES
Filed March 20, 1928　　　2 Sheets-Sheet 1
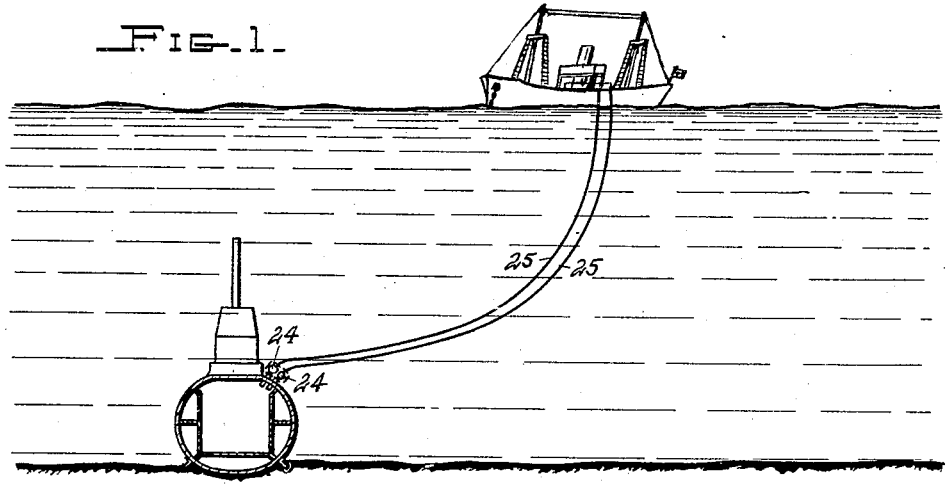
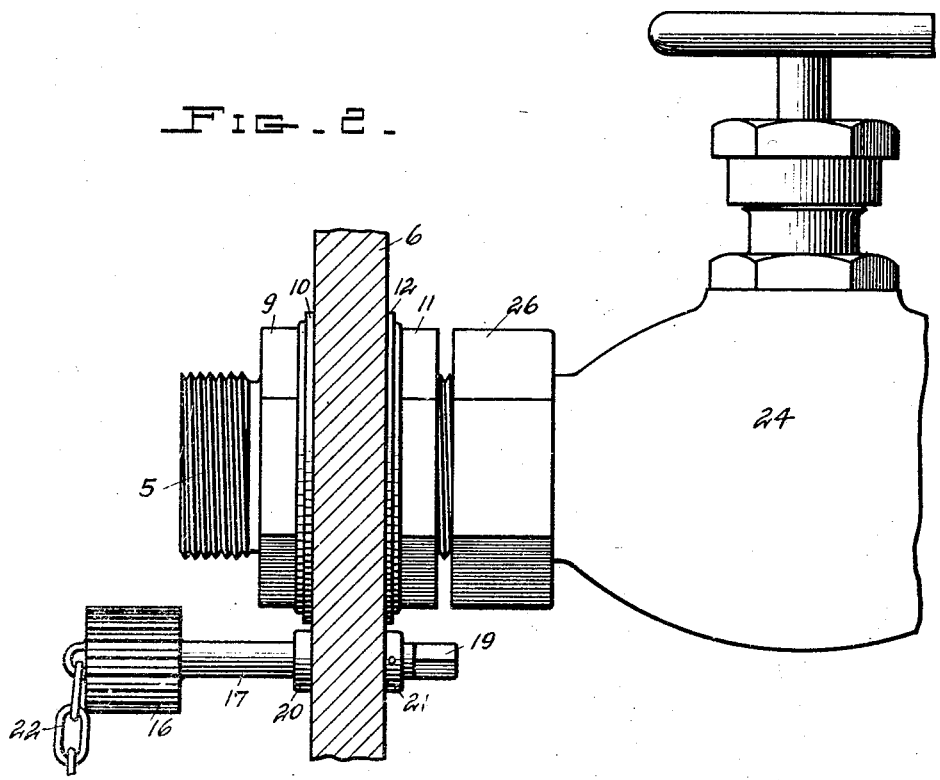
WITNESSES:
INVENTOR:
Richard E. Andrew,
BY
ATTORNEY.

Dec. 17, 1929.   R. E. ANDREW   1,739,815
SAFETY DEVICE FOR SUBMARINES
Filed March 20, 1928   2 Sheets-Sheet 2

WITNESSES:

INVENTOR:
Richard E. Andrew,
BY
ATTORNEY.

Patented Dec. 17, 1929

1,739,815

UNITED STATES PATENT OFFICE

RICHARD E. ANDREW, OF PHILADELPHIA, PENNSYLVANIA

SAFETY DEVICE FOR SUBMARINES

Application filed March 20, 1928. Serial No. 263,181.

This invention relates to safety devices for submarines and the like, and more particularly to a hose connection through which air and liquid food may be supplied to men imprisoned in a sunken submersible.

The object of the invention is to provide a simple device of this character which may be placed in operation from without the vessel and which does not protrude far enough from the shell to offer an appreciable amount of resistance to the water when the vessel is moving beneath the surface.

The invention includes a conduit extending through the shell of the submarine having closures at both ends, and mechanism operable from the outside of the vessel for removing inner closure. This means may take the form of a shaft extending through the shell and geared to the closure which is threaded to the inner end of the conduit, the shaft having one end protruding from the vessel and adapted for turning by means of a suitable tool.

Figure 1 is a schematic drawing showing a sunken submarine equipped with two of my improved devices from which air lines lead to the rescue ship;

Figure 2 is a fragmentary section through the side of the submarine shown in Figure 1, showing a valve attached to the hose connection and the inner cap removed;

Figure 3:
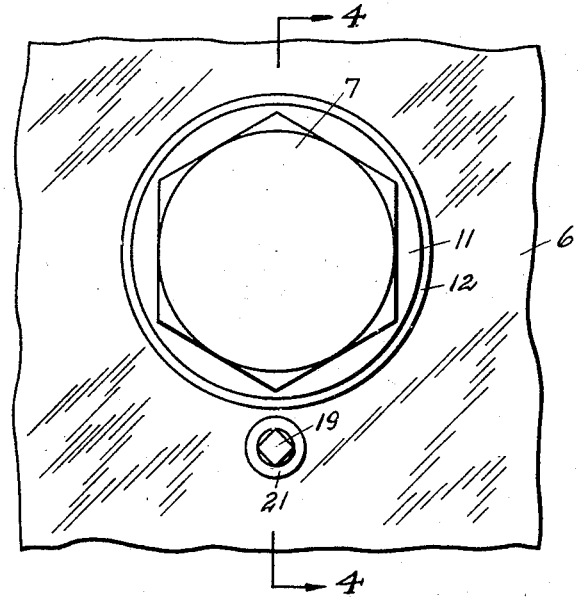
Figure 3 is an outside view of a small fragment of the submarine shown in Figure 1, but showing the outer cap in position, and Figure 4 a central longitudinal section through one of my devices, taken on line 4—4 on Figure 3.
Figure 4:
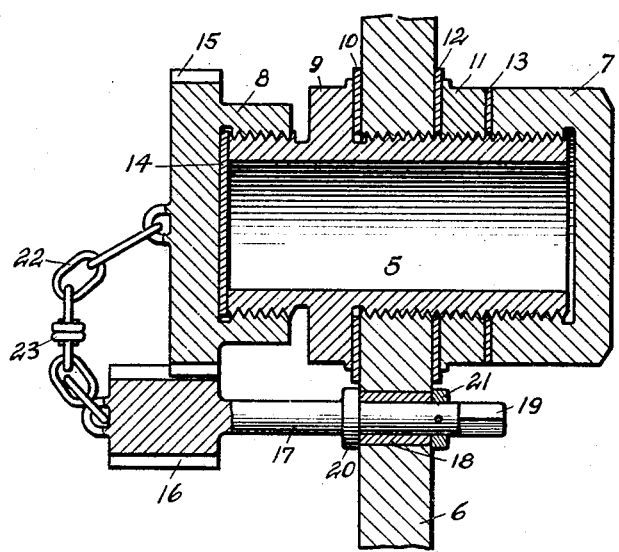

The invention consists of a short conduit extending through the shell, caps for closing the ends of the conduit, and a shaft extending through the shell and provided with a gear for removing the inner cap. Conduit 5 is threaded through the shell 6 of a submarine, its outer end closed by a cap 7, and its inner end by a cap 8. Conduit 5 may be locked in position by suitable lock nuts but is shown provided with an integral hexagonal collar 9, which may be drawn up snugly against a gasket 10 placed between it and the shell, and with a hexagonal lock nut 11 which may be drawn up snugly against a gasket 12 placed between it and the shell. Collar 9 may be positioned against either the inside or the outside of the shell.

A gasket 13 is placed between cap 7 and lock nut 11 and a gasket 14 between the end of conduit 5 and the inside of cap 8. The several gaskets are provided for preventing water from passing through conduit 5 and from coming in contact with the threads and corroding them. These gaskets may be of any suitable packing material or of soft metal.

A gear 15 is formed integral with cap 8 and meshes with a pinion 16 secured to, or formed on, a shaft 17 extending through shell 6 and rotatably mounted in a packing gland 18. Shaft 17 has a square part 19 formed on its outer end and is held against axial movement by collars 20 and 21, one of which may be formed integral with the shaft and the other fixed thereon in any suitable manner.

By applying a wrench to square part 19 and rotating shaft 17, cap 8 may be unscrewed, gear 15 moving along the teeth on pinion 16 until the cap is clear of the end of the conduit when it may fall downwardly as far as permitted by a chain 22 connecting the cap and gear and provided at its center with a swivel 23 which allows cap 8 and pinion 16 to rotate relatively to one another.

In attaching an air line to one of my devices installed on a sunken submarine, a valve 24 is attached to the end of a hose 25 and lowered alongside the submarine after it has been located by a diver. The diver unscrews cap 7 and attaches valve 24, which is preferably provided with a coupling nut 26, to conduit 5. If the men in the submarine are unable to remove cap 8, he removes it by turning shaft 17 and then opens valve 24, allowing air to be pumped into the submersible. It is to be noted that the only water entering the submarine is the small amount contained in conduit 5 before valve 24 is secured thereto. Each compartment of the submarine is preferably provided with two hose connections so that air may be pumped through one air line and exhausted through the other.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:—

1. A safety device for submersible vessels including a conduit secured in the shell of the vessel, caps threaded onto the ends of the conduit, a gear formed on the inner cap, a shaft adapted to be rotatably mounted in the shell of the vessel, a pinion on the shaft meshing with the gear, and means for rotating the shaft.

2. A safety device for submersible vessels including a conduit threaded through the shell of the vessel, gaskets encircling the conduit and abutting each side of said shell, a collar formed on the conduit and abutting one gasket, a lock nut threaded onto the conduit and abutting the other gasket, caps threaded onto the ends of the conduit, a gear formed on one cap, a gland in said shell, a shaft rotatable in the gland, a pinion fixed on one end of the shaft and meshing with the gear, a square part on the other end, and flexible means connecting the pinion and gear.

In testimony whereof I have signed my name to this specification.

RICHARD E. ANDREW.